Aug. 12, 1924.
H. R. ROFFMANN
DEMOUNTABLE RIM
Filed Sept. 2, 1922
1,504,509
2 Sheets-Sheet 1
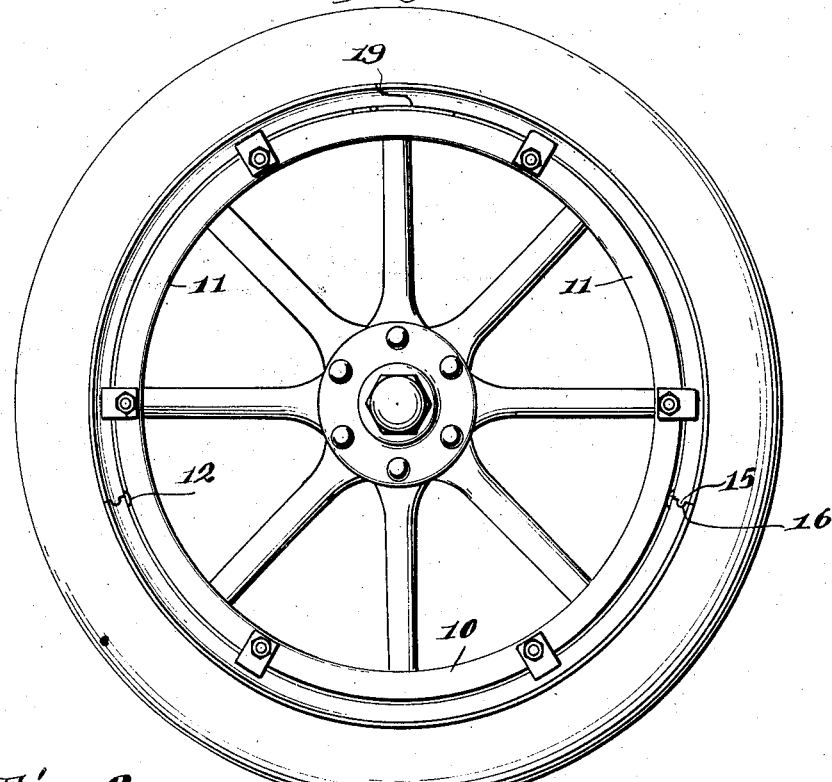
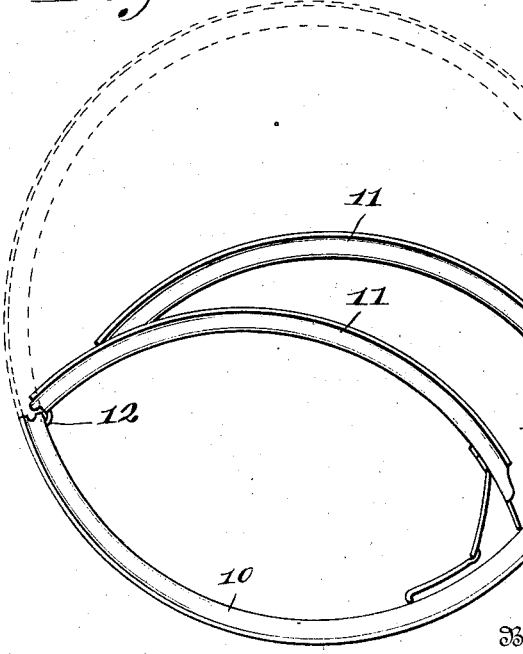
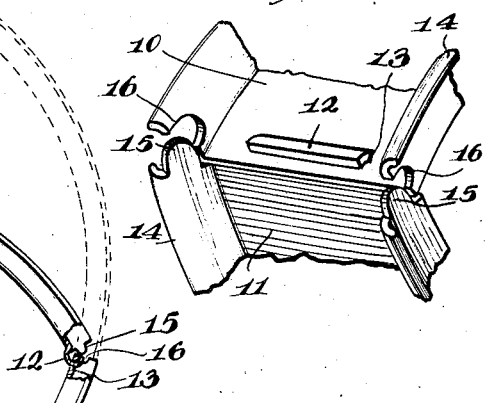
Inventor
Harold R. Roffmann
By Alfred T. Gage
Attorney Aug. 12, 1924.
H. R. ROFFMANN
1,504,509
DEMOUNTABLE RIM
Filed Sept. 2, 1922    2 Sheets-Sheet 2
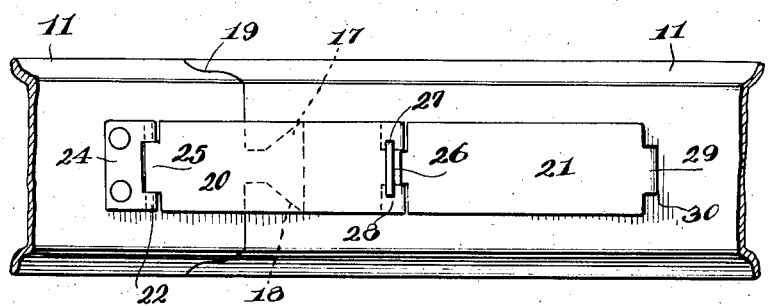
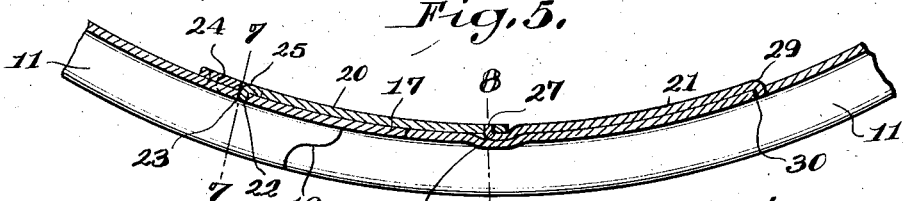
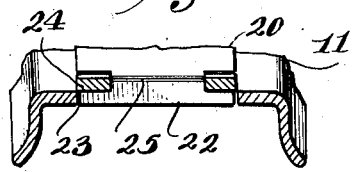
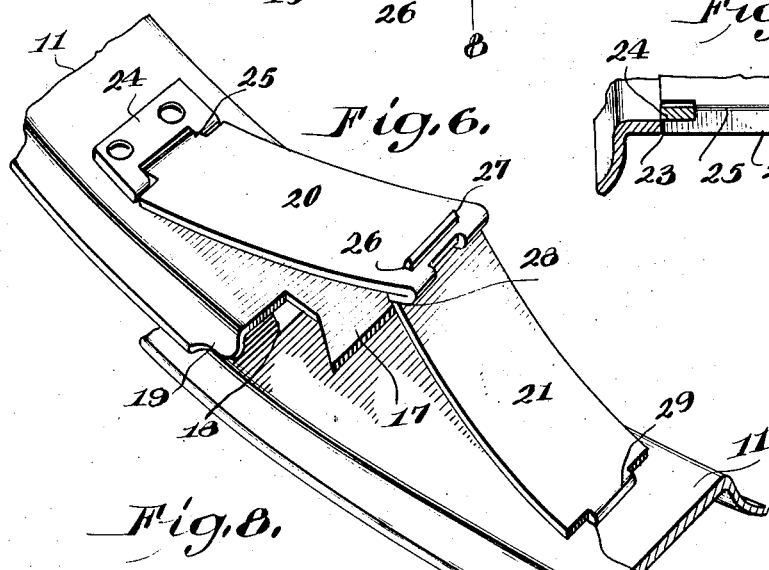
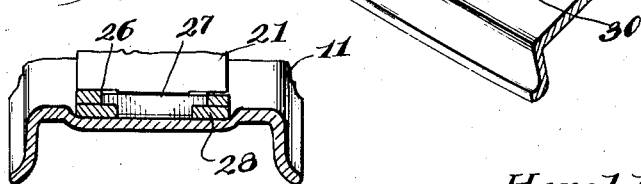
Inventor
Harold R. Roffmann
By Alfred T. Gage
Attorney Patented Aug. 12, 1924.

1,504,509

UNITED STATES PATENT OFFICE.

HAROLD R. ROFFMANN, OF NEW YORK, N. Y.

DEMOUNTABLE RIM.

Application filed September 2, 1922. Serial No. 585,985.

*To all whom it may concern:*

Be it known that I, HAROLD R. ROFFMANN, citizen of the United States, residing at New York, in the county of New York and State of New York, have invented certain new and useful Improvements in Demountable Rims, of which the following is a specification.

This invention relates to a demountable rim and particularly to a construction comprising pivoted foldable segments adapted to collapse the rim when desired.

The invention has for an object to provide a novel and improved construction wherein the abutting rim ends are interlocked and a toggle member disposed over such ends for the purpose of expanding the rim and locking the same in such position.

A further object of the invention is to present a new construction of toggle member in which broad substantial pivots are formed integral therewith and the structure materially simplified, strengthened and reduced in cost of production.

Another object of the invention is to provide an improved pivotal connection between the segments comprising an elongated slot and tongue pivot and an interlocking contact at the side walls of the rim.

Other and further objects and advantages of the invention will be hereinafter set forth and the novel features thereof defined by the appended claims.

In the drawings—

Figure 1 is a side elevation of the rim applied to a wheel and tire;

Figure 2 is a similar view of the rim collapsed, with one joint in section;

Figure 3 is a detail perspective of the pivot between the segments;

Figure 4 is a detail plan of the toggle;

Figure 5 is a longitudinal section thereof;

Figure 6 is a detail perspective of the toggle partially collapsed;

Figure 7 is a section on line 7—7 of Figure 5; and

Figure 8 is a similar view on line 8—8 of Figure 5.

Like numerals refer to like parts in the several figures of the drawings.

The rim herein shown is formed of a main segment 10 and two folding segments 11 connected thereto by a special form of pivot which provides a broad bearing and prevents movement of the segments when the rim is in expanded position. This pivot comprises a lug 12 extended from one segment and passing through an elongated slot 13 in the abutting segment, the lug being curved or bent so as to remain in the slot when the segments are collapsed and thus prevents separation thereof. The side walls 14 of the rim segments are also interlocked by a tongue 15 upon one segment entering a groove or recess 16 upon the connected segment. As shown by section in Figure 2, and also in Figure 3, the folding segments are always connected to the main segment.

The abutting end of one of the folding segments is provided with a dovetailed extension 17 adapted to enter a corresponding recess 18 in the abutting segment, while the meeting side walls of the segments are formed with a curved overlapping portion 19 as indicated in Figures 4 and 5. Above this interlocked joint, a toggle device is disposed and consists of the plates 20 and 21. The former is provided at one end with a pivoting bar 22 which enters a slot 23 in the rim and is held in position by a plate 24 secured to the segment to overlap the bar head and embrace the neck 25 thereof, as shown in Figure 7.

The toggle plates are pivoted together by means of a slot 26 in the member 20 which receives a T-head 27 upon the plate 21, the parts being secured to prevent disconnection by turning over the end of the plate 20, as at 28, to embrace the head 27, as shown by Figure 8. The opposite end of the plate 21 is angularly disposed to form a foot 29 which enters a slot 30 in the segment, and in the expanding action bears against a wall thereof. This foot is readily disconnected from the slot when the segments are collapsed.

In the operation of the invention with the parts collapsed as in Figure 2, the segments are opened to the dotted line position and the foot of the toggle engaged with the slot, as shown in Figure 6. Pressure is then applied by the operator to the toggle plates which expands the rim, causing the ends of the folding segments to interlock automatically, and when the toggle reaches the position shown in Figures 4 and 5 the parts are firmly locked. The use of toggle plates provides a wide substantial bearing for the operator's foot in applying pressure to expand the rim, and the formation of the bearing heads upon the plates produces a broad firm bearing not liable to side play or accidental injury which frequently occurs when bearing lugs and pivot pins are used. The construction embodies both simplicity and economy in construction as it provides for the formation of the toggle pivots upon these members and only requires the use of slots in the segments, thus effecting the maximum strength and rigidity in the rim. It will be noted that the circumferential strain is carried by the interlocked ends of the segments and the toggle only acts to expand or collapse these members and does not form a section of the rim. This same rigid bearing between the main and folding segments is secured through the pivotal and interlocked connections there provided. While the specific details of the invention have been shown and described it is not confined thereto as recited in the following claims.

What I claim is—

1. A tire rim comprising pivoted segments each provided with an aperture adjacent its free end, and toggle members formed with a head secured in the aperture of one segment to provide a fixed pivot and a foot to detachably interlock with the aperture in the abutting segment and freely separable therefrom.

2. A tire rim comprising pivoted segments each provided with an aperture adjacent its free end, toggle members having an elongated pivot and slot connection, a pivoting head upon one of said members disposed in the aperture of one segment, a plate upon said segment for securing said head against removal to form a fixed pivot, and an angularly disposed foot upon the other toggle member adapted to detachably engage the aperture in the abutting segment.

3. A tire rim comprising pivoted segments each provided with an aperture adjacent its free end, a toggle member having a pivot head at one end to enter one of said apertures and a plate at its opposite end, a cooperating toggle member having a pivot head to enter said slot and an inturned foot to detachably engage the other segment aperture, and means for retaining said heads in position to form fixed pivots.

4. A tire rim comprising pivoted segments each provided with an aperture adjacent its free end, a toggle member having a pivot head at one end to enter one of said apertures and a slot at its opposite end, a plate secured to the segment to retain said head in position, a cooperating toggle member having a pivot head to enter said slot and an angularly disposed foot to engage the other segment aperture, and a bent portion upon the first mentioned toggle member to retain said last mentioned pivot head in position.

5. A tire rim comprising pivoted segments each having a transverse slot adjacent its free end, a toggle member having a T-head at one end to enter one of said apertures and a slot at its opposite end, a plate secured to the segment to embrace the neck of said head, a cooperating toggle member having a T-head to enter the last mentioned slot and an angularly disposed foot to engage the other segment aperture, and an over-bent free end of the first mentioned toggle member to embrace the neck of the last mentioned T-head.

In testimony whereof I affix my signature.

HAROLD R. ROFFMANN.